A. H. BRYANT.

Egg-Carriers.

No. 5,392. Reissued May 6, 1873.

Witnesses.
E. N. Bates.
Geo. E. Upham,

Inventor.
A. H. Bryant,
Chipman & Osmer & Co,
Attorneys.

AM. PHOTO-LITHOGRAPHIC CO. N.Y. (OSBORNE'S PROCESS.)

UNITED STATES PATENT OFFICE.

ABNER H. BRYANT, OF CHICAGO, ILLINOIS.

IMPROVEMENT IN EGG-CARRIERS.

Specification forming part of Letters Patent No. 104,261, dated June 14, 1870; reissue No. 5,392, dated May 6, 1873; application filed April 5, 1873.

*To all whom it may concern:*

Be it known that I, ABNER H. BRYANT, of Chicago, in the county of Cook and State of Illinois, have invented a new and valuable Improvement in Egg-Carriers; and I do hereby declare that the following is a full, clear, and exact description of the construction and operation of the same, reference being had to the annexed drawing making a part of this specification and to the letters and figures of reference marked thereon.

Figure 1:
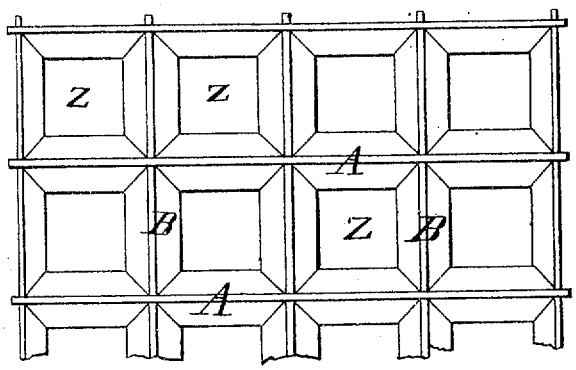
Figure 3:
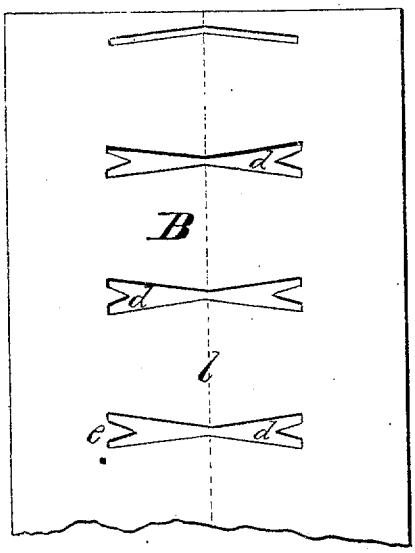
Figure 2:
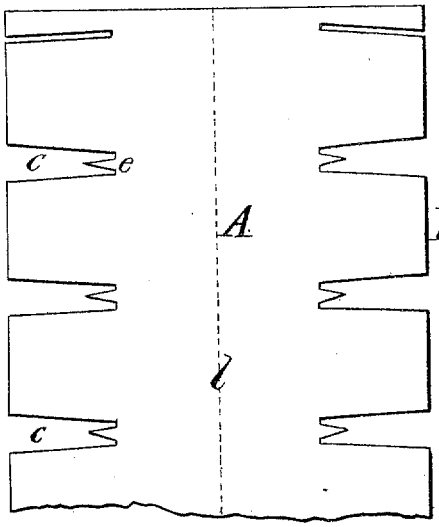

Figure 1 of the drawing is a representation of a top view of my egg-carrier. Fig. 2 is a view of one form of strip before the same is folded. Fig. 3 is a similar view of the transverse strip.

My invention relates to means for transporting eggs; and consists in providing strips of pasteboard or other suitable material with inclined or sloping notches or slits, whereby the strips may be woven together in such a manner as to form pockets with inclined walls, spaces being thereby provided between the walls of adjacent pockets, so that said walls may give to the pressure of the eggs, obviating in a great measure their liability to fracture on account of shocks, jolting, or shaking in the transportation. The strips are designed to be woven together in such a manner as to form layers of pockets, adapted to be placed one above another in a basket, barrel, or other vehicle, and, by the elasticity of the walls and the intermediate spaces, to prevent the fracture of the eggs by external shocks or pressure against each other.

The accompanying drawing indicates a form in which the strips having the inclined notches or slits may be woven together.

Designating on the drawing the strips which form two opposite walls of a pocket by the letter A, the letter B will indicate the other two walls of the pocket, which run at right angles with the walls A. The strips A and B are rectangular in form, or, at least, have their upper and lower edges parallel, and are provided, respectively, with inclined or sloping notches *c c* and *d d*, whereby they are interwoven with each other to form the pockets Z Z. The strips indicated in the drawing are made double, being folded longitudinally along the central line *l*. This is not essential, but is sometimes preferred, as the walls, when constructed in this way, are more elastic. The notches *d d* extend from the upper edge of the partition downward, while the notches *c c* extend from the lower edges of the partition upward, and the connection is made by placing the strips at right angles with each other, inserting the walls into the notches and pressing them together until the upper edges are brought on the same level. The notch or slot *d* in the strip B is made in the upper portion thereof, while the notch *c* is made in the lower portion of the strip A. Tongues *e* extend from the bases of these notches, respectively upward and downward. These jut upward and downward between the walls of the partitions running at right angles, and serve to keep them in position. They are not indispensable, however.

What I claim as new, and desire to secure by Letters Patent, is—

1. The combination, with the strips A having sloping or inclined notches in the lower edges, of the strips B having the sloping or inclined notches in their upper edges, substantially as specified.

2. Strips of pasteboard or other flexible material provided with inclined or sloping notches or slits in their upper or under edges, substantially as specified.

3. The strip A having inclined or sloping notches in its lower edge and separating-tongues, substantially as specified.

4. The strip B having inclined or sloping notches in its upper edge and separating-tongues, substantially as specified.

In testimony that I claim the above I have hereunto subscribed my name in the presence of two witnesses.

ABNER H. BRYANT.

Attest:

GEORGE E. UPHAM,
D. D. KANE.